United States Patent Office 2,953,562
Patented Sept. 20, 1960

2,953,562

BASIC UNSATURATED CARBOXYLIC ACID AMIDES AND THEIR PREPARATION

Wilhelm Alfons Schuler, Bad Homburg, and Albert Gross, Frankfurt am Main, Germany, assignors to Deutsche Gold- und Silber-Scheideanstalt vormals Roessler, Frankfurt am Main, Germany No Drawing. Filed Apr. 6, 1959, Ser. No. 804,125
Claims priority, application Germany Apr. 12, 1958

3 Claims. (Cl. 260—247.2)

The present invention relates to new therapeutically valuable basic substituted carboxylic acid amides of the general formula

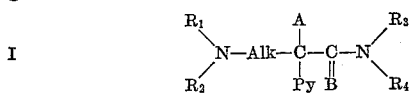

in which $R_1$, $R_2$, $R_3$ and $R_4$ can be identical or different aliphatic radicals containing 1 to 3 carbon atoms, $R_1$ and $R_2$ or $R_3$ and $R_4$ or both can be closed to the same or different saturated or unsaturated 5 or 6 membered rings which may contain a further heteroatom, for example, $R_1$ and $R_2$ and/or $R_3$ and $R_4$ can be closed to form piperidino, piperideino, pyrrolidino or morpholino rings. When $R_1$ to $R_4$ are not closed to form a ring as indicated, they can be saturated or unsaturated, straight or branch chained. When none of $R_1$ to $R_4$ are closed to a ring as indicated, at least one thereof must be unsaturated, for example, a vinyl radical or alkenyl radical. Alk is a straight or branch chained alkylene radical containing 2 to 4 carbon atoms. A preferably is a phenyl radical but also can be a pyridyl radical. Py is a pyridyl radical. B preferably is oxygen but also can be sulfur.

Compounds of general Formula I can be prepared by reacting a pyridine halide with a tertiary carboxylic acid amide of the fomula

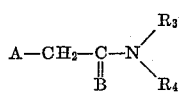

in the presence of a basic condensing agent, such as, soda amide, sodium hydroxide or sodium hydride, and then reacting the tertiary acetamide formed, if desired, without isolation, with an amino alkyl halide of the formula

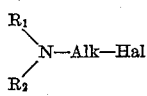

The compounds also can be prepared by reacting a tertiary carboxylic amide of the formula

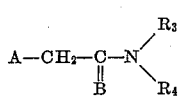

with a tertiary alkyl amino halide in the presence of a basic condensing agent to form a condensation product of the formula

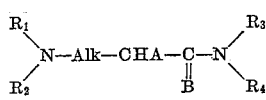

which then can be reacted with a pyridine halide.

The compounds of general Formula I also can be prepared by reacting an amino alkyl halide of the formula

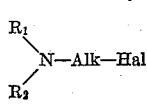

in the presence of a basic condensing agent with a compound of the formula $$A—CH_3 \qquad (2)$$

such as toluene or a picoline to produce a compound of the formula

This compound can then be reacted with a carbamic acid derivative of the formula

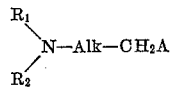

in which X signifies a halogen atom or a lower alkoxy group in the presence of a basic condensing agent to form a compound of the formula

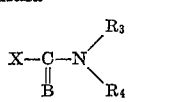

This compound can then be reacted with one mol of a pyridine halide in the presence of a basic condensing agent to produce a compound of Formula I.

Compounds of general Formula I can also be prepared by reacting compound 3 with 1 mol of pyridine halide in the presence of a basic condensing catalyst to produce a compound of the formula

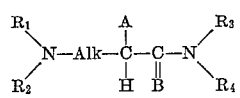

Upon reaction of compound 6 with the carbamic acid derivative 4 compounds of general Formula I are again obtained.

Furthermore a compound of Formula 2 can be reacted with a pyridine halide in the presence of a basic condensing catalyst to produce a compound of the formula $$A—CH_2—Py \qquad (7)$$

Upon reaction of a compound of the Formula 7 with a compound of the Formula 4 in the presence of a basic condensing agent a compound of the formula

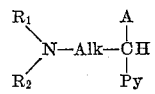

is obtained.

When this compound is reacted with a compound of Formula 1 compounds of the general Formula I are again obtained.

It is also possible to react a compound of the Formula 7 with a compound of the Formula 1 to produce a compound of the Formula 6 which can be reacted with a compound of the Formula 4 to produce a compound of general Formula I.

Two further methods are applicable in the preparation of compounds of the type of general Formula I in which A is the same as Py.

In the first of such methods a compound of the formula

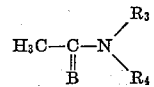

is reacted in the presence of a basic condensing agent.

with two moles of a pyridine halide to produce a compound of the formula

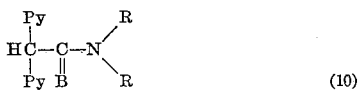

This compound is then condensed with a compound of the Formula 1 to produce a compound of the type of Formula I.

In the second method a compound of the Formula 9 is first reacted with a compound of the Formula 1 to form a compound of the formula

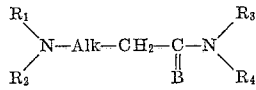

This compound is then reacted with two moles of a pyridine halide to produce a compound of the type of Formula I.

In the various combinations of the steps employed in the production of the novel compounds according to the invention of Formula I, it is not necessary in many instances to isolate the intermediate products obtained in a preceding step or steps before carrying out the next step or steps.

The bases of the general Formula I can be converted into their salts in a known manner, for example, by reaction with hydrogen halides. The compounds of general Formula I can contain optically active carbon atoms. The optically active antipodes can be resolved in the usual manner, for example, by salt formation with optically active acids. On the other hand, for example, an optically active tertiary phenyl pyridyl acetamide can be employed in the synthesis.

The compounds according to the invention are valuable analgesics, which can be applicated orally or by injection.

The following examples will serve to illustrate a number of embodiments of the invention.

*Example 1*

47.2 g. of phenyl acetic acid pyrrolidide in 500 cc. of toluene were heated to boiling in a round flask provided with a stirrer, a dropping funnel and a reflux condenser, and 21 g. of soda amide, as a 50% suspension in toluene, dropped in over a period of 10 minutes. Thereafter, 28.4 g. of 2-chloropyridine were added over a period of 25 minutes and the mixture refluxed for a further 2 hours. The ensuing reaction was noticeable because of the more active boiling engendered thereby. The phenyl-pyridyl-acetpyrrolidide produced can be isolated and melts at 107–109° C. However, in this instance it was not isolated and 14.8 g. of a 50% suspension of soda amide in toluene were added to the reaction mixture over a period of 5 minutes and the mixture refluxed for a period of 5 minutes. Thereafter, a solution of 32.9 g. of morpholinoethyl chloride in 30 cc. of toluene was added and the mixture refluxed for 2½ hours. After cooling down the reaction mixture water was added and the toluene phase separated off. Water was added to the toluene solution and sufficient dilute HCl added that the pH of the aqueous solution reacted acid (pH 5–6). The aqueous phase was separated off and rendered alkaline with NaOH and extracted with ether. The ether extract was dried with potash and after driving off the ether the residue was vacuum distilled. The morpholinoethyl-phenyl-pyridyl-acetpyrrolidide produced boiled at 255–265° C. at 4 mm. Hg and was obtained in a 64% yield. After recrystallization from a mixture of toluene and petroleum ether the base melted at 92–95° C. The corresponding hydrochloride salt after recrystallization from methyl ethyl ketone melts at 91–92° C.

*Example 2*

The procedure of Example 1 was repeated except that the morpholinoethyl chloride was replaced by dimethylaminoethyl chloride. Dimethylaminoethyl-phenyl-pyridyl-acetpyrrolidide was obtained in a 77% yield. The free base boils at 215–222° C. at 4 mm. Hg and after recrystallization from ethyl acetate melts at 93–94° C. The corresponding hydrochloride salt melts at 168–170° C.

*Example 3*

153.5 g. of phenyl acetic acid pyrrolidide was dissolved in 700 cc. of toluene and boiled under reflux in a round flask as in Example 1. Then 93 g. of a 50% suspension of soda amide in toluene were added over a period of 10 minutes and the mixture boiled for a period of 20 minutes. Then 109 g. of dimethylaminoethyl chloride dissolved in 100 cc. of toluene were added over a period of 30 minutes and the mixture boiled for a further 2¼ hours. After the reaction mixture cooled down, water was added and the toluene phase separated off. Sufficient dilute HCl was added to the toluene solution until the aqueous phase had a pH of 5–6. The aqueous phase was separated off, rendered alkaline and extracted with ether. The ether extract was dried with potash and the ether driven off and the residue vacuum distilled. The dimethylaminoethyl - phenyl - acetpyrrolidide produced boiled at 182–187° C. at 4 mm. Hg and was obtained in a 70% yield. The base after recrystallization from benzine melted at 72–73° C. This base was then condensed with 2-chloropyridine and soda amide as described in Example 1 to produce dimethylaminoethyl-phenyl-pyridyl-acetpyrrolidide (M.P. 93–94° C.).

*Example 4*

53.2 g. of phenyl-pyridyl-acetpyrrolidide prepared as in Example 1 were dissolved in 400 cc. of toluene in a round flask as in Example 1 and heated to boiling. Then 14.8 g. of a 50% suspension of soda amide in toluene and 36 g. of 1 morpholino-2-chloropropane were added and the mixture refluxed for 2½ hours. After the reaction mixture cooled down, water was added and the toluene phase separated off. Water was added to the toluene solution and sufficient dilute HCl added until the water phase had a pH of 5–6. The aqueous phase was separated off, rendered alkaline, and extracted with ether. The ether extract was dried with potash, the ether driven off and the residue vacuum distilled. 47.4 g. of morpholino-isopropyl-phenyl-pyridyl-acetpyrrolidide distilled over at 230–250° C. at 4 mm. Hg. This base was dissolved in 24 cc. of isopropanol and neutralized with isopropanolic HCl. 120 cc. of ether were slowly added to the resulting solution which amounted to about 80 cc. After 2 days' standing, the resulting hydrochloride salt was filtered off on a suction filter and recrystallized twice from a little isopropanol. The hydrochloride salt melted at 201–202° C.

*Example 5*

7 parts by weight of finely divided soda amide were added portionwise to 29 parts by weight of phenyl-acetic acid-dimethylamide in 150 parts by weight of boiling toluene. After the evolution of ammonia had ceased 20 parts by weight of 2-chloropyridine were added over a period of 45 minutes. The ensuing reaction was noticeable through the increased boiling activity engendered thereby. The mixture was refluxed for a further 2 hours and after the reaction mixture had cooled down, 100 parts by weight of water were added. The toluene layer was washed 3 times with 50 parts by weight of water and then dried with potassium carbonate. The toluene was then evaporated off to leave 36 parts by weight of alpha-phenyl-alpha-(2-pyridyl)-acetic acid-dimethylamide which crystallized to a solid upon trituration. The melting point thereof after recrystallization from methyl ethyl ketone was 95–98° C.

4 parts by weight of finely divided soda amide were added to 24 parts by weight of the phenyl-pyridyl-acetic acid-dimethylamide in 200 parts by weight of boiling toluene and after evolution of ammonia had ceased 17 parts by weight of 1-chloro-2-morpholino-ethane were added thereto. The mixture was boiled for a further 3 hours and after the mixture had cooled down water was added thereto. The toluene layer was extracted with dilute HCl and the base precipitated from the resulting aqueous extract by addition of aqueous NaOH. The base was taken up in ether and dried. After the ether was evaporated off, 26 parts by weight of alpha-phenyl-alpha - (2 pyridyl) - gamma-morpholino-butyric acid-dimethylamide remained as a residue which crystallized upon trituration. Its melting point after recrystallization from methyl ethyl ketone was 98.5° C. The hydrochloride thereof melted at 190–192° C.

Example 6

52 parts by weight of phenyl-(2 pyridyl)-acetic acid-pyrrolidide in 350 parts by weight of boiling toluene was reacted analogously to Example 1 with 7 parts by weight of soda amide and 34.5 parts by weight of 1-chloro-2-piperidino-propane. 75 parts by weight of a mixture of alpha - phenyl - alpha - (2 pyridyl)-beta-methyl-gamma-piperidino-butyric acid-pyrrolidide and of alpha-phenyl-alpha - (2 - pyridyl)-gamma-piperidino-valeric acid-pyrrolidide were obtained.

This mixture was dissolved in 75 parts by weight of petroleum ether and 21 parts by weight of one of the structural isomers crystallized therefrom. The melting point thereof was 135–138° C. The melting point of its hydrochloride was 205–207° C.

The second structural isomer remained as an oily residue in the mother liquor from the crystallization. Titration of the residue indicated that it contained exactly 2 equivalents of basic nitrogen.

Example 7

27 parts by weight of phenyl-pyridyl-acetic acid-pyrrolidide (produced as in Example 1) were reacted in 200 parts by weight of boiling toluene with 4 parts by weight of finely divided soda amide and then with a solution of 16 parts by weight of 1-chloro-2-piperidino-ethane in toluene. After 3 hours' boiling, the reaction mixture was cooled down and 100 parts by weight of water added thereto. The organic phase was separated off, extracted with dilute HCl and the extract processed as in Example 1. 35 parts by weight of alpha-phenyl-alpha-(2 pyridyl)-gamma-piperidino-butyric acid-pyrrolidide were recovered from the ether solution. After recrystallization from ethyl acetate it melted at 116–118° C. Its hydrochloride melted at 191–193° C.

Example 8

Analogously to Example 7, 32 parts by weight of alpha - phenyl - alpha - (2-pyridyl)-gamma-pyrrolidino-butyric acid-pyrrolidide were obtained from 27 parts by weight of phenyl-pyridyl-acetic acid-pyrrolidide, 4 parts by weight of soda amide and 15 parts by weight of 1-chloro-2-pyrrolidino-ethane. It was a tough non-crystallizable oil, the hydrochloride of which melted at 160–163° C.

Example 9

Example 7 was repeated except that 15 parts by weight of 1-chloro-2-diethylamino-ethane were employed instead of the 1-chloro-2-piperidino-ethane. 32 parts by weight of oily alpha - phenyl-alpha-(2-pyridyl)-gamma-diethylamino-butyric acid-pyrrolidide were obtained, the hydroscopic hydrochloride of which melted at 142–144° C.

Similarly when using 18 parts by weight of 1-chloro-2-diisopropylamino-ethane, 36 parts by weight of alpha-phenyl - alpha - (2-pyridyl)-gamma-diisopropylamino-butyric acid-pyrrolidide were obtained. Its melting point after recrystallization from isopropanol was 84–86° C. The melting point of the hydrochloride was 178–180° C. Similarly when using 18 parts by weight of 1-chloro-2-diallylamino-ethane, 34 parts by weight of oily alpha-phenyl - alpha - (2 pyridyl) - gamma-diallylamino-butyric acid-pyrrolidide were obtained, the hydrochloride of which melted at 148–151° C.

Similarly when using 15 parts by weight of 1-chloro-2-(N-methyl-N-allylamino)-ethane, 28 parts by weight of alpha - phenyl-alpha - (2 pyridyl)-gamma-(N-methyl-N-allylamino)-butyric acid-pyrrolidide were obtained, the hydrochloride of which melted at 189° C.

Similarly when employing 13.5 parts by weight of 1-chloro-3-dimethylamino-propane, 30 parts by weight of alpha - phenyl - alpha-(2 pyridyl)-delta-dimethylamino-valeric acid-pyrrolidide were obtained. Its hydrochloride could not be crystallized. Potentiometric titration of the free base indicated that it contained 99% of the theoretical of basic nitrogen.

Example 10

189 parts by weight of phenyl-acetic acid-pyrrolidide in 2000 parts by weight of boiling xylene were reacted with 36 parts by weight of finely divided soda amide. After evolution of ammonia had ceased, a solution of 79 parts by weight of 3-bromo-pyridine in 100 parts by weight of xylene were slowly added over a period of one hour and the mixture boiled for a further 5 hours. After the reaction mixture had cooled down, 200 parts by weight of water were stirred in. The resulting upper phase was separated off and extracted with dilute HCl. The extract was rendered alkaline and then shaken with chloroform. The chloroform layer was dried with potassium carbonate and the chloroform driven off. 88 parts by weight of alpha-phenyl-alpha-(3 pyridyl)-acetic acid pyrrolidide were obtained, which after recrystallization from ethyl acetate melted at 149° C. The melting point of its hydrochloride was 223–224° C.

27 parts by weight of the crude product were reacted with 18 parts by weight of 1-chloro-2-morpholino-propane as described in Example 7. The 33 parts by weight of reaction product, which were recovered, were dissolved in 25 parts by weight of methyl ethyl ketone and separated from 3 parts by weight of precipitated starting material and then purified chromatographically on activated alumina. An oily mixture of the structural isomers, alpha-phenyl-alpha-(3-pyridyl)-beta-methyl - gamma - morpholino-butyric acid-pyrrolidide and alpha-phenyl-alpha - (3-pyridyl)-gamma-morpholino-valeric acid-pyrrolidide was obtained. Potentiometric titration of the mixture indicated that it contained 101% of the theoretical of basic nitrogen.

Example 11

Analogously to Example 1, 95 parts by weight of phenyl-acetic acid-pyrrolidide in 300 parts by weight of boiling toluene were reacted with 20 parts by weight of finely divided soda amide and then with 79 parts by weight of 4-bromo-pyridine. After 2½ hours' boiling, the reaction mixture was cooled down, mixed with 100 parts by weight of water and the toluene layer separated off. After a short period of standing, 96 parts by weight of crude alpha-phenyl-alpha-(4-pyridyl)-acetic acid-pyrrolidide (M.P. 131° C.) precipitated out of the toluene layer.

27 parts by weight of this product were reacted with 15 parts by weight of 1-chloro-2-morpholino-ethane in the manner described in Example 7 and the reaction mixture processed analogously. 37 parts by weight of impure alpha-phenyl-alpha-(4-pyridyl) - gamma - morpholino-butyric acid-pyrrolidide were obtained. Upon reaction with the calculated amount of isopropanolic hydrobromic acid, the hydrobromide having a melting point of 129° C. was obtained. This was dissolved in water and the solution rendered alkaline, and the free base taken up in ether and purified chromatographically on activated alumina. Potentiometric titration of the oily residue of the eluate indicated that it contained 99% of the theoretical of basic nitrogen.

Example 12

36 parts by weight of alpha,alpha-di-(2-pyridyl)-acetic acid-pyrrolidide (M.P. 103° C.) in 100 parts by weight of boiling toluene were reacted with 5.3 parts of soda amide and 22 parts by weight of 1-chloro-2-morpholino-propane as described in Example 1. After 8 hours' heating, the reaction mixture was cooled down and mixed with 50 parts by weight of a 30% aqueous potassium carbonate solution. The upper phase was dried with solid potassium carbonate and the solvent removed under vacuum. 50 parts by weight of the reaction product remained as an oily residue which was a mixture of the structural isomers, alpha,alpha-di-(2-pyridyl) - gamma-morpholino-valeric acid-pyrrolidide and alpha,alpha-di-(2-pyridyl)-beta-methyl-gamma-morpholino-butyric acid-pyrrolidide. The compounds in the mixture were converted into the hydrochlorides, which were dissolved in a small quantity of chloroform and then fractionally precipitated by the addition of ether. Out of the total of 5 fractions, 13 parts by weight of the more difficultly soluble hydrochloride of one of the structural isomers (M.P. 183–184° C.) and 19 parts by weight of the more easily soluble hydrochloride of the other structural isomer (M.P. 168–169° C.) were recovered by repeated recrystallization from chloroform-ether.

Example 13

Analogously to Example 12, 27 parts by weight of di-(2-pyridyl)-acetic acid-pyrrolidide were reacted with 4 parts by weight of 1-chloro-2-piperidino-ethane. 37 parts by weight of crude alpha,alpha-di-(2-pyridyl)-gamma-piperidino-butyric acid-pyrrolidide were obtained which crystallized upon purification with benzine. After recrystallization from acetone-benzine its melting point was 108–119° C. The melting point of its hydrobromide was 167–168° C.

Example 14

Analogously to Example 12, 24 parts by weight of di-(2-pyridyl) acetic acid-dimethylamide (B.P. 3 mm. Hg 200–205° C.) were reacted with 4 parts by weight of soda amide and 15 parts by weight of 1-chloro-2-morpholino-ethane. 33 parts by weight of oily alpha,alpha-(2-pyridyl)-gamma-morpholino-butyric acid - dimethylamide were obtained. The melting point of its hydrobromide was 190° C.

Example 15

(a) 80 parts by weight of a 50% suspension of finely divided soda amide in benzene were mixed with 100 parts by weight of alpha picoline and 108 parts by weight of 1-chloro-2-dimethylamino-ethane in 240 parts by weight of benzene. The mixture was heated to boiling for 15 hours, allowed to cool down, and then admixed with 150 parts by weight of water. The upper phase was separated off, dried with solid KOH and distilled over a short column. First, 45 parts by weight of alpha-picoline (B.P. 70 mm. Hg 65–80° C.) were recovered and thereafter the 1-(2-pyridyl)-3-dimethylamino-propane distilled over at 101–110° C. at 2 mm. Hg as a colorless oil. 65 parts by weight thereof, corresponding to an 82% yield on reacted alpha-picoline, were obtained.

(b) 65 parts by weight of this product were dropped into a suspension of phenyl sodium prepared from 20 parts by weight of sodium dust and 48 parts by weight of chlorobenzene in 200 parts by weight of benzene. The mixture was stirred for 2 hours at 40° C. and thereafter 60 parts by weight of pyrrolidine-N-carbonic acid-ethyl ester were dropped in. After three further hours the reaction mixture was allowed to cool down and 200 parts by weight of water were added thereto. The upper phase was dried with potassium carbonate and distilled. 40 parts by weight of alpha-(2-pyridyl)-gamma-dimethylamino-butyric acid-pyrrolidide was obtained as a thick oil (B.P. 4 mm. Hg 180–188° C.). 35 parts by weight of 1-(2-pyridyl)-3-dimethylamino-propane were recovered.

(c) 6 parts by weight of soda amide in the form of a 50% suspension in benzene were dropped into a boiling solution of 40 parts by weight of alpha-(2-pyridyl)-gamma-dimethylamino-butyric acid-pyrrolidide in 150 parts by weight of toluene. After evolution of ammonia ceased, 25 parts by weight of 2-bromo-pyridine were added and the mixture refluxed for a further 2 hours. The reaction mixture after cooling was mixed with water and the toluene solution separated off. The toluene solution was extracted with dilute aqueous HCl, taking care that the pH of the aqueous phase after shaking was not below 6–7. The solution of the hydrochloride of alpha-alpha - di - (2-pyridyl) - gamma-dimethylamino-butyric acid-pyrrolidide obtained upon combination of the aqueous extracts was super-saturated with solid potassium carbonate and extracted with ether. Upon evaporation of the ether the free base was obtained as a yellow oil which did not crystallize even after standing for weeks. Potentiometric titration thereof indicated that it contained exactly 2 equivalents of basic nitrogen. The hydrochloride, hydrobromide and picrate of such compound cannot be obtained in crystalline form. The yield of alpha,alpha-di-(2-pyridyl) - gamma-dimethylamino-butyric acid-pyrrolidide was 50% of the theoretical.

Example 16

(a) 17 parts by weight of 2-benzyl pyridine in 75 parts by weight of toluene were heated to boiling with 4 parts by weight of finely divided soda amide with stirring under exclusion of air. The ammonia evolution ceased after 1 hour and thereafter 11 parts by weight of 1-dimethylamino-2-chloro-ethane were dropped into the boiling mixture and the heating continued for 2 further hours. After the reaction mixture had cooled down, 50 parts by weight of water were added thereto and the toluene phase separated off. The toluene phase was extracted with dilute HCl, the aqueous extract rendered alkaline with strong aqueous KOH and the oily free base which separated out was taken up in ether. Upon vacuum distillation 20 parts by weight of 1-phenyl-1-(2-pyridyl)-3-dimethylamino-propane were obtained as a thick yellow oil having a boiling point of 180–185° C. at 6 mm. Hg.

(b) 12 parts by weight of this product were boiled under reflux with 2 parts by weight of finely divided soda amide in 50 parts by weight of toluene. After evolution of ammonia ceased, 7 parts by weight of pyrrolidine-N-carbonic acid chloride were dropped into the boiling reaction solution over a period of 30 minutes and the mixture heated for another 3 hours. After the reaction mixture had cooled down, 50 parts by weight of water were added thereto and the upper phase separated off. The latter was extracted with dilute HCl, and the free base liberated from the extract with strong aqueous KOH. The base was taken up in ether, dried and the ether solution purified chromatographically on activated alumina. 11 parts by weight of alpha-phenyl-alpha-(2-pyridyl)-gamma-dimethylamino-butyric acid-pyrrolidide were obtained as a yellow oil when the eluate was boiled down. It crystallized upon trituration with benzine (M.P.=92–94° C.).

Example 17

(a) 34 parts by weight of di-(2-pyridyl)-methane were heated with 8 parts by weight of finely divided soda amide and 150 parts by weight of toluene until the evolution of ammonia ceased. The heating was turned off and 27 parts by weight of pyrrolidino-N-carbonic acid chloride in 80 parts by weight of toluene were dropped in, the mixture stirred for a further hour and then heated to boiling for another 30 minutes. After the reaction mixture cooled, 50 parts by weight of water were added. The upper phase was separated off, dried with potassium carbonate and fractionally distilled under vacuum. 32 parts by weight of di-(2-pyridyl)-acetpyrrolidide of a boiling point of 240–250° C. at 5 mm. Hg which crystallized after trituration with a little acetone were obtained. The melting point thereof after recrystallization from acetone-petroleum ether was 104° C. 10 parts by weight of di-(2-pyridyl)-methane were recovered from the first runnings of the distillation.

(b) 27 parts by weight of this product were heated with 8 parts by weight of finely divided soda amide in 100 parts by weight of toluene until evolution of ammonia ceased. Then 15 parts by weight of 1-piperidino-2-chloro-ethane were added dropwise therein and the mixture boiled under reflux for a further 4 hours. After the reaction mixture had cooled, 50 parts by weight of water were added thereto, the upper phase separated off and dried with potassium carbonate. The dried upper phase was then distilled under vacuum to remove the solvent. The residue crystallized upon trituration with light benzine. 33 parts by weight of alpha-alpha-di-(2-pyridyl)-gamma-piperidino-butyric acid-pyrrolidide of a melting point of 110° C. were obtained. Its hydrobromide after recrystallization from ethanol-ether melted at 167° C.

Example 18

12 parts by weight of acetpyrrolidide were heated with 4 parts by weight of finely powdered soda amide in 100 parts by weight of toluene until the ammonia evolution ceased. Thereafter 23 parts by weight of 2-chloropyridine were dropped in and the mixture refluxed for 7 hours. After the mixture had cooled down, 50 parts by weight of water were added thereto and the water phase saturated with potassium carbonate. The upper phase was dried and distilled under vacuum. 9 parts by weight of di-(2-pyridyl)-acetpyrrolidide of a boiling point of 220–225° C. at 3 mm. Hg were obtained. It solidified after trituration with acetone (M.P. 103–104° C.).

Example 19

44 parts by weight of acetic acid dimethyl amide and 113 parts by weight of 2-chloropyridine were heated to boiling in 150 parts by weight of toluene and 24 parts by weight of finely divided soda amide added thereto portionwise. The mixture was heated for a further 2 hours while passing nitrogen therethrough, then permitted to cool and then mixed with 100 parts by weight of water. The lower phase was separated off and super-saturated with 50 g. of potassium carbonate and then extracted twice with benzene. The extracts were united with the upper phase. The upper phase was dried with potassium carbonate and then fractionally distilled over a short column under vacuum.

After a first running of 12 parts by weight of 2-chloropyridine, a fraction of 21 parts by weight of di-(2-pyridyl)-acetic acid-dimethylamide (B.P. 234–235° C., at 10 mm. Hg.) was obtained as a tough brown oil which crystallized upon longer standing. This fraction was warmed with 2.3 parts by weight of finely divided soda amide until evolution of ammonia ceased. Then 13 parts by weight of 1-chloro-2-piperidino-ethane in 50 parts by weight of toluene were dropped in and the mixture refluxed for 5 hours. After the mixture cooled down, 100 parts by weight of water were added thereto. The aqueous phase was super-saturated with potassium carbonate and extracted with benzene. The benzene extract and toluol phase were united, dried and boiled down. 25 parts by weight of oily alpha,alpha-di-(2-pyridyl)-gamma-piperidino-butyric acid-dimethylamide were obtained which upon addition of the calculated quantity of isopropanolic HCl gave a monohydrochloride of a melting point of 208–211° C.

We claim:
1. A compound of a formula selected from the group consisting of

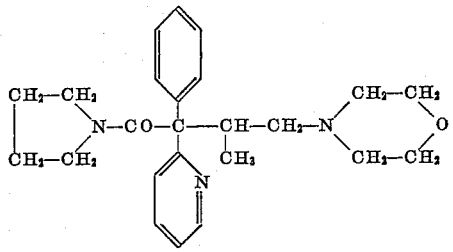

and

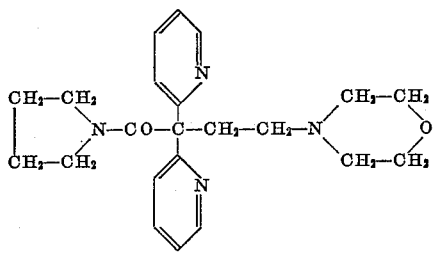

2. A compound of the formula

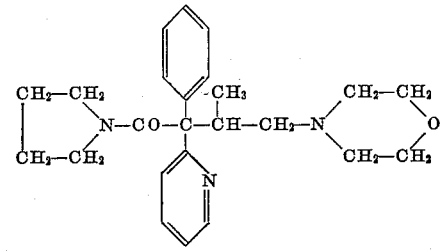

3. A compound of the formula

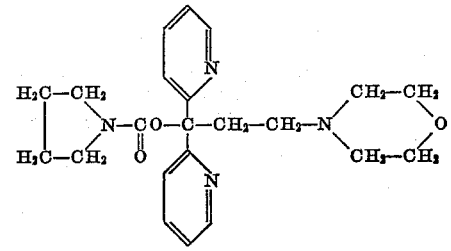

References Cited in the file of this patent
UNITED STATES PATENTS

| | | |
|---|---|---|
| 2,823,233 | Speeter | Feb. 11, 1958 |
| 2,841,589 | Brandstrom et al. | July 1, 1958 |

OTHER REFERENCES

Janssen et al.: J. Pharm. and Pharmacol., vol. 10 (1958), pp. 14–21.
Janssen et al.: J. Pharm. and Pharmacol., vol. 9 (1957), pp. 381–400.
Janssen et al.: Arch. Intern. Pharmacodynamie, vol. 103 (1955), pp. 82, 84, 91.

UNITED STATES PATENT OFFICE
CERTIFICATE OF CORRECTION

Patent No. 2,953,562            September 20, 1960

Wilhelm Alfons Schuler et al.

It is hereby certified that error appears in the printed specification of the above numbered patent requiring correction and that the said Letters Patent should read as corrected below.

Column 10, lines 43 to 54, the structural formula should appear as shown below instead of as in the patent:

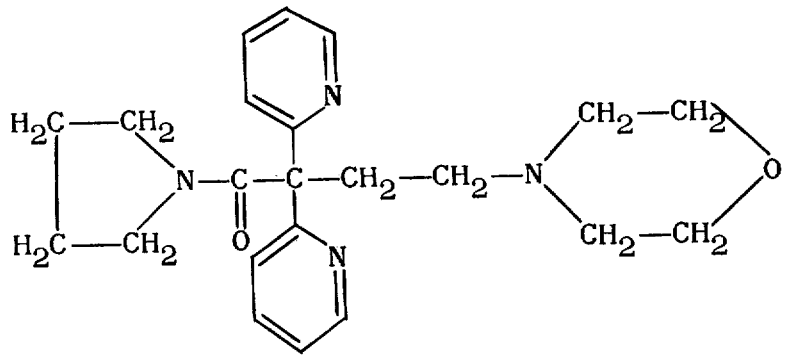

Signed and sealed this 18th day of April 1961.

(SEAL)
Attest:

ERNEST W. SWIDER
Attesting Officer

DAVID L. LADD
Commissioner of Patents